United States Patent
Dessert et al.

(10) Patent No.: US 7,783,259 B2
(45) Date of Patent: Aug. 24, 2010

(54) SYSTEM AND METHOD OF ELIMINATING OR MINIMIZING LO-RELATED INTERFERENCE FROM TUNERS

(75) Inventors: David Dessert, Wylie, TX (US); John Schneider, Frisco, TX (US)

(73) Assignee: Microtune (Texas), L.P., Plano, TX (US)

( * ) Notice: Subject to any disclaimer, the term of this patent is extended or adjusted under 35 U.S.C. 154(b) by 1236 days.

(21) Appl. No.: 10/952,185

(22) Filed: Sep. 28, 2004

(65) Prior Publication Data

US 2006/0068708 A1    Mar. 30, 2006

(51) Int. Cl.
H04B 1/00 (2006.01)
H04B 17/00 (2006.01)

(52) U.S. Cl. .......... 455/63.1; 455/67.13; 455/296; 455/315; 348/725; 348/731

(58) Field of Classification Search .......... 455/63.1, 455/310–311, 296, 317, 283, 196.1, 150.1, 455/67.13, 295, 313, 315, 173; 348/725, 348/726, 731, 732, 735, 555, 556, 559; 725/131, 725/151

See application file for complete search history.

(56) References Cited

U.S. PATENT DOCUMENTS

| | | | |
|---|---|---|---|
| 5,519,890 A | | 5/1996 | Pinckley |
| 6,057,876 A | * | 5/2000 | Waight .................. 725/151 |
| 6,151,488 A | * | 11/2000 | Brekelmans ............. 455/150.1 |
| 6,272,191 B1 | | 8/2001 | Inamori |
| 6,308,056 B1 | | 10/2001 | Abe et al. |
| 6,567,654 B1 | | 5/2003 | Coronel Arredondo et al. |
| 6,785,527 B2 | | 8/2004 | Earls |
| 6,861,968 B2 | | 3/2005 | Melanson et al. |
| 6,876,839 B2 | | 4/2005 | Harris |
| 6,898,420 B2 | | 5/2005 | Black et al. |
| 6,968,278 B1 | * | 11/2005 | Christensen et al. .......... 702/69 |
| 2004/0002318 A1 | | 1/2004 | Kerth et al. |
| 2004/0250284 A1 | * | 12/2004 | Dong et al. .................. 725/68 |
| 2005/0047486 A1 | | 3/2005 | Sakaue et al. |
| 2006/0068708 A1 | | 3/2006 | Dessert et al. |
| 2007/0053414 A1 | | 3/2007 | Payne et al. |

FOREIGN PATENT DOCUMENTS

| | | |
|---|---|---|
| EP | 0 595 314 A1 | 5/1994 |
| EP | 1 182 774 A2 | 2/2002 |
| EP | 1 233 508 A2 | 8/2002 |
| GB | 2 414 351 A | 11/2005 |

OTHER PUBLICATIONS

International Search Report and Written Opinion issued for PCT/US2005/034819 dated Jan. 24, 2006.
International Search Report and Written Opinion issued for PCT/US2008/065069; Dated: Jul. 28, 2008; 10 Pages.

* cited by examiner

Primary Examiner—Quochien B Vuong
(74) Attorney, Agent, or Firm—Fulbright & Jaworski L.L.P.

(57) ABSTRACT

Disclosed are systems and methods of eliminating or reducing interference resulting from harmonics of local oscillator frequencies of mixers. In one embodiment, a determination is made as to a zone or zones in which harmonics result in undesired spur generation. Inter-tuner spurs and intra-tuner spurs may be identified such that frequency information of the identified spurs may be utilized to define a plurality of exclusion zones. LO frequencies may subsequently be efficiently selected in view of the exclusion zone information. Embodiments may also determine a score for identified spurs which may be used to optimally select from within a set of spur-generating local oscillator frequencies.

62 Claims, 5 Drawing Sheets

SYSTEM AND METHOD OF ELIMINATING OR MINIMIZING LO-RELATED INTERFERENCE FROM TUNERS

CROSS-REFERENCE TO RELATED APPLICATIONS

The present invention is related to and commonly assigned U.S. patent applications Ser. No. 10/319,118 entitled "System and Method for Discovering Frequency Related Spurs in a Multi-Conversion Tuner," filed Mar. 13, 2002, Ser. No. 08/904,693 entitled "Dual Mode Tuner for Co-Existing Digital and Analog Television Signals," filed Aug. 1, 1997, and Ser. No. 09/572,393 entitled "Broadband Integrated Tuner," filed May 16, 2000, the disclosures of which are hereby incorporated herein by reference in their entirety.

TECHNICAL FIELD

The invention generally relates to tuner circuits and more particularly to the elimination or reduction of spurious signals in two or more single or multiple conversion tuners by dynamic selection of the frequency of a first IF signal.

BACKGROUND OF THE INVENTION

Devices requiring two or more tuners or frequency converters are well known. Plug-and-Play™, TiVo™, set-top boxes and televisions with picture-in-picture are examples of such devices. In the current state of the art, tuners are often separately packaged and engage separate portions of the device in order to minimize tuner interference. By maintaining some physical separation between tuners of such devices cross-talk and interference generated by the tuners can be minimized. However, the ability to maintain useful separation between tuners has been limited as the size of such devices continues to diminish. Development is also being made to integrate two or more tuners on a single circuit board. One challenge of miniaturization of such devices is the elimination or minimization of multi-tuner interference. RF shielding and/or extensive RF filtering and circuitry is often needed to suppress tuner generated interference.

To improve sensitivity and selectivity in modem tuners, there is a need to minimize noise and spurious frequency elements (spurs) that can occur in the tuner output. Spurs can be generated from multiple sources, such as internal switching, quantization noise, or other device components. As described in more detail below, tuners can also be sources of spurs. The identification of intra-tuner spurs in multi-conversion tuners is the subject of U.S. Ser. No. 10/319,118, entitled "System and Method for Discovering Frequency Related Spurs in a Multi-Conversion Tuner," hereby incorporated by reference herein. In a multiple tuner device, spurs may include intra-tuner spurs and inter-tuner spurs generated by local oscillators of the tuners. Other spur types and sources also exist.

Single conversion and multiple conversion tuners are well known. Such tuners often utilize one or more local oscillators in the mixing process. Examples of double conversion tuners are shown as tuners 106 and 108 in FIG. 1. In a double conversion tuner, an incoming signal at frequency $ff_{IN}$ is mixed with a signal at frequency $ff_{LO1}$ from a local oscillator (LO) to produce a signal at an intermediate frequency $f_{IF}$. This signal is then mixed with a signal at frequency $f_{LO2}$ from a second local oscillator to produce the desired output frequency $f_{OUT}$. The frequencies of the first and second LO signals are usually selected so that the first IF signal and output signal occur either at a specific frequency or within a specified frequency range.

Figure 1:
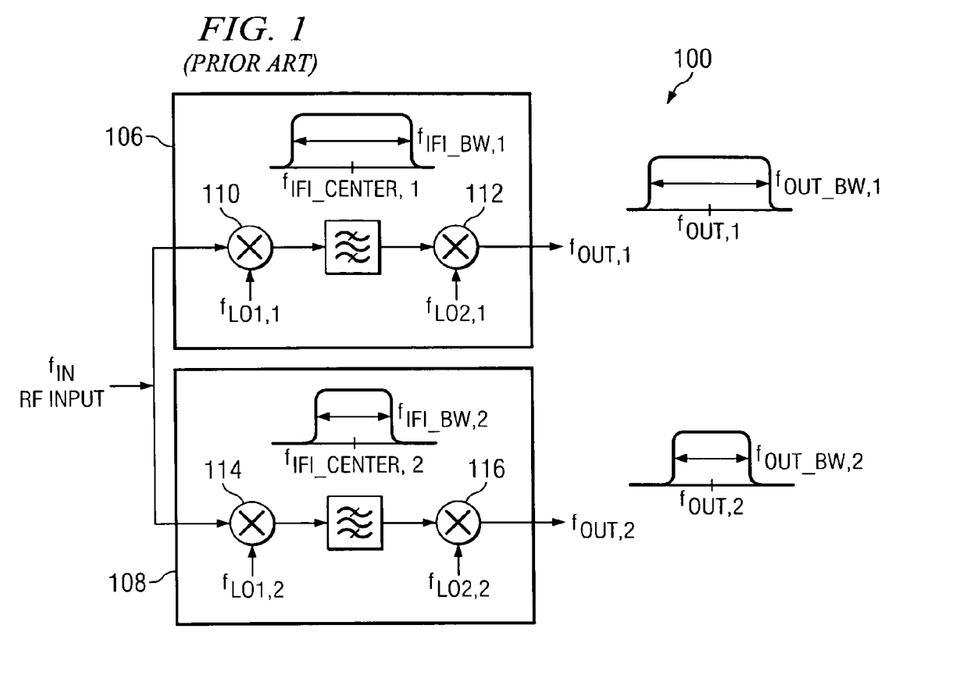
FIG. 1 is a simplified diagram of a multiple tuner system of the prior art, wherein each tuner has a pair of mixing stages.

Devices having multiple tuners are also well known. A dual tuner system is shown as tuner system 100 in FIG. 1. Specifically, tuner system 100 includes a pair of double conversion tuners 106 and 108, although a multiple tuner system may comprise other tuner configurations (e.g., single conversion tuners or a combination of single and multiple conversion tuners). In a dual tuner system, multiple LO's may be utilized to produce two desired output frequencies, $f_{OUT,1}$ and $f_{OUT,2}$. In the example of FIG. 1, each tuner 106 and 108 includes a pair of mixers, shown here as mixers 110 and 112 and mixers 114 and 116, respectively, wherein the $f_{LOi,j}$ signals are mixed to produce $f_{OUT,1}$ and $f_{OUT,2}$.

To improve sensitivity and selectivity in modern tuners, there is a need to minimize noise and spurious frequency elements (spurs) that can occur in the tuner output(s). Spurs can be generated from multiple sources, such as internal switching, quantization noise, or other device components. As described in more detail below, tuners can also be sources of spurs. Generally any or all spurious signals are undesirable and, if possible, should be reduced or eliminated to enhance tuner operation.

Single tuner systems can have intra-tuner spurs related to the frequency harmonics of one or more associated local oscillators. In single-conversion tuners, spurs may be related to the harmonics of its associated local oscillator. In double conversion tuners, spurs may be related to combinations of the harmonics of the first and second local oscillators frequencies ($f_{LO1}$ and $f_{LO2}$). The identification of intra-tuner spurs in multi-conversion tuners is the subject of the above referenced patent application entitled "System and Method for Discovering Frequency Related Spurs in a Multi-Conversion Tuner."

Multiple tuner systems can be affected by both intra-tuner spurs and inter-tuner spurs. As in a single tuner system, each tuner of a multiple tuner system may be affected by intra-tuner spurs related to the harmonics of its own local oscillator(s). Additionally, each tuner in a multiple tuner system may be affected by inter-tuner spurs which are spurs related to frequency harmonics of local oscillators of both the subject tuner and any neighboring tuner(s).

An efficient method of eliminating or minimizing the effects of spurs in multiple tuner systems would be desirable.

BRIEF SUMMARY OF THE INVENTION

The present invention is directed to systems and methods of eliminating or reducing interference resulting from harmonics of local oscillator frequencies of the mixers. In one embodiment, a determination is made as to a zone or zones in which harmonics result in undesired spur generation. In preferred embodiments of the invention, one or more exclusion zones of local oscillator frequency combinations are identified within which spurs are generated. In some situations spurs in the tuner output are unavoidable. For example, the opportunity to adjust local oscillators may be limited to a range of frequencies within which one or more spurs always exist. As some spurs are more significant (e.g., cause greater interference) than other spurs, preferred embodiments of the invention may also determine a score for identified spurs which may be used to optimally select from within a set of spur-generating local oscillator frequencies.

In one embodiment, a method of the present invention identifies inter-tuner spurs and intra-tuner spurs and utilizes frequency information of the identified spurs to define a plurality of exclusion zones. LO frequencies may subsequently be efficiently selected in view of the exclusion zone information. In a preferred embodiment, the selection of local oscillator frequencies hinges on the selection of a preferred intermediate frequency, IF, of the tuner. As described herein, a preferred IF may be identified with knowledge of the boundaries of the exclusion zone.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

One of the known approaches to spur elimination is to change the LO frequencies of the tuner in order to shift the spur outside of an output bandwidth or an output band of interest. For a given spur (such as a spur associated with two times the first LO and three times the second LO) that falls within the output pass band, the LO frequencies can be changed (up or down) a certain amount, which will, in effect, still allow the circuit to tune to the desired output frequency, but the spur will be shifted up or down and outside of the output bandwidth of the tuner. The invention disclosed herein is directed, in one aspect, toward efficient selection of LO frequencies in order to eliminate a spur. The concepts of the present invention may be applied to eliminate or minimize LO-related interference in single tuner systems (e.g., intra-tuner spurs in multi-conversion tuners) as well as to eliminate or minimize LO-related interference in multiple tuner systems (e.g., intra-tuner spurs in multi-conversion tuners and inter-tuner spurs between multiple tuners).

Efficient identification of spurs is desirable. One method for identifying spurs falling within a particular band, such as the tuner output band or other band of interest, is to look at all the harmonics of the first LO, mixed with all the harmonics of the second LO and, one by one, check off each one. Thus, if a circuit designer is looking up to the $15^{th}$ harmonic of the first LO and the $15^{th}$ harmonic of the second LO, the designer checks one times $f_{LO1}$ (first harmonic) and one times $f_{LO2}$ (first harmonic) to see if there is a spur of concern. If there is no spur of concern, then the designer continues with one times $f_{LO1}$ (first harmonic) and two times $f_{LO2}$ (second harmonic) to see if there is a spur of concern. If not, then the process continues with one times $f_{LO1}$ (first harmonic) and three times $f_{LO2}$ (third harmonic) to see if there is a spur of concern. Once all harmonics of $f_{LO2}$ have been considered, the harmonic of the first LO frequency may be incremented and each harmonic of the second LO frequency again considered. That is, the designer continues with two times $f_{LO1}$ (second harmonic) and one times $f_{LO2}$ (first harmonic) to see if there is a spur of concern, and so on. This results in $n^2$ combinations being looked at. This is a time consuming method. Even assuming that the mathematics of how spurs are generated allows for the elimination of quite a few of the coefficients for the first and second LO, the operation remains essentially an $n^2$ operation.

Another method for identifying spurs is disclosed in the above referenced patent application entitled "System and Method for Discovering Frequency Related Spurs in a Multi-Conversion Tuner." In a disclosed embodiment, a determination is made as to a band or bands in which harmonics could possibly result in interference and determining which combination of LO frequencies result in harmonics not falling within the determined band or bands. Preferred embodiments leverage the fact that harmonics of a particular frequency are evenly spaced to avoid examining all of the possible harmonics. For example, rather than calculate every harmonic and check that each calculated harmonic does not fall within the determined band or bands, embodiments of that invention determine the smallest harmonics that are greater than each edge of the determined band or bands. An interfering spur, a difference of the LO harmonics falling within the band or bands, may be determined to exist where the smallest harmonic difference for a particular LO harmonic that is greater than a first edge of a determined band is not equal to the smallest harmonic difference for the particular LO harmonic that is greater than a second edge of the determined band.

Once spurs have been identified, they can be eliminated by selecting different LO frequencies. Such LO frequency selection can be via a random process, e.g., a new set of LO frequencies can be randomly selected and the spur calculations again performed to determine whether a spur exists within the band of interest. However, a more efficient method for selecting alternative LO frequencies would be desirable.

Figure 2:
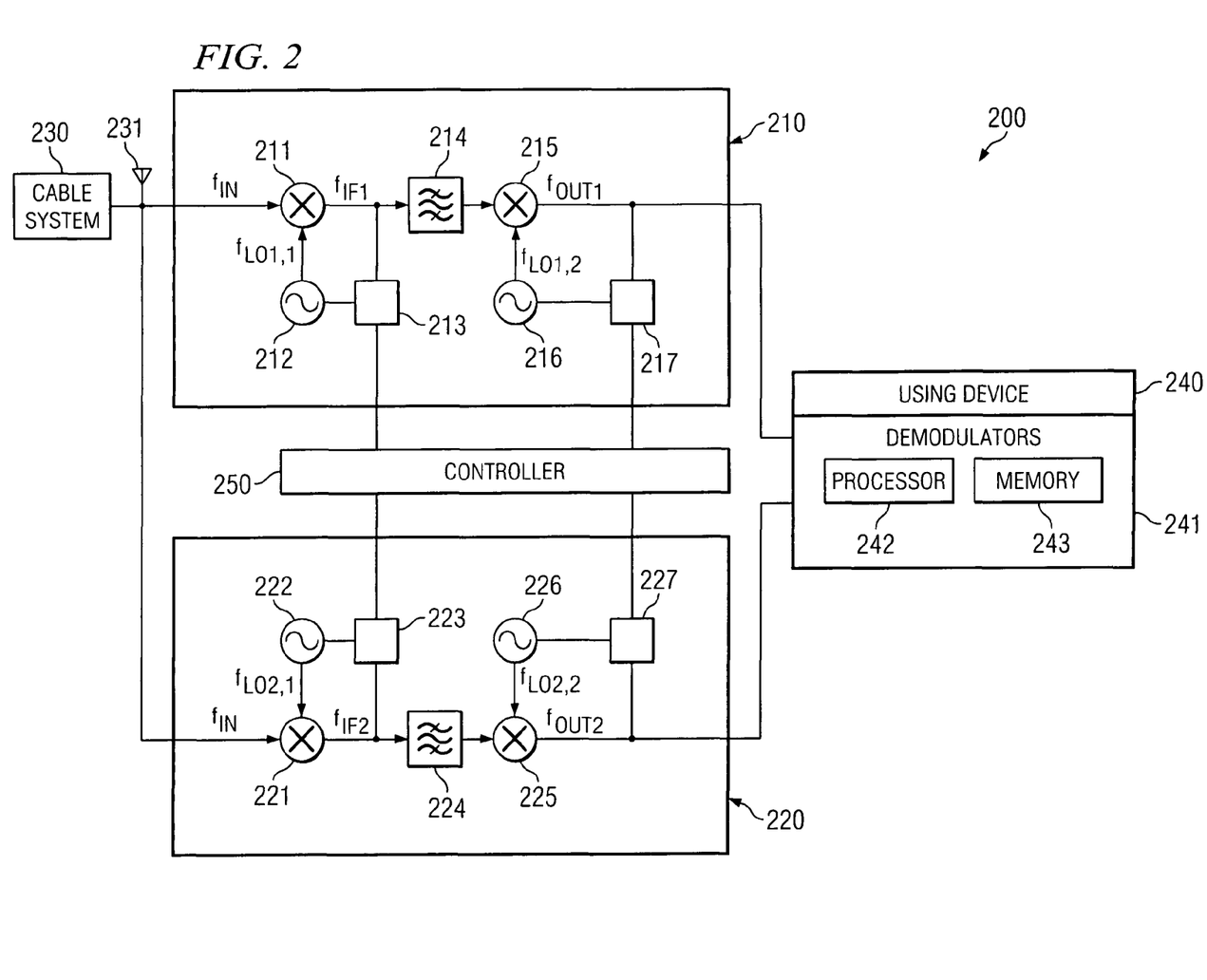
FIG. 2 shows one embodiment of a system using the concepts of the present invention.

FIG. 2 shows a simplified block diagram of multiple tuner system 200 having a pair of double conversion tuners, shown here as tuners 210 and 220. Examples of devices comprising such a system include a set-top cable box, cable modem, Plug-and-Play™ device, TiVo™ device, and a television with picture-in-picture capability. RF signals are input to multiple tuner system 200. Although the illustrated embodiment shows RF signals being provided by cable system 230 and antenna 231, RF signals may be received from any number of sources, such as a satellite system, or other signal source.

In the illustrated embodiment of multiple tuner system 200, tuners 210 and 220 are double conversion tuners. However, embodiments of the present invention may be utilized with respect to multiple tuner systems in which one or more tuners provide frequency conversion in a number of stages different than that illustrated, e.g., single conversion tuners, triple conversion tuners, quadruple conversion tuners, etcetera. Moreover, embodiments of the present invention may be utilized with respect to tuner systems having a number of tuners different than that illustrated, e.g., single tuner systems, triple tuner systems, quadruple tuner systems, etcetera. The exemplary embodiment, however, is shown and described with respect to multiple tuners, each having multiple frequency conversion stages, in order to concisely present concepts of the present invention.

A first mixer of tuner 210, mixer 211, is connected to the RF input signal, $f_{IN}$, and the output, $f_{LO1,1}$, of LO 212. Mixer 211 receives both the RF input signal, $f_{IN}$, and the first LO signal produced by LO 212, $f_{LO1,1}$, and generates an output signal, which may be called the first IF, shown as $f_{IF1}$. The frequency of the signal produced by LO 212 is controlled by a tuning a phase locked loop circuit, shown as circuit 213, which is, in turn, controlled by system controller 250 through a control interface.

The first IF signal, generated by mixer 211, is connected through IF filter 214, which attenuates undesired signals. The output of IF filter 214 is connected to a second mixer of tuner 210, mixer 215. Once the first IF signal generated by mixer 211 has been filtered, it is mixed with a second local oscillator signal, $f_{LO1,2}$, generated by local oscillator 216, whose output is connected to mixer 215. Mixer 215 operates to generate an output signal, $f_{OUT1}$. The frequency of the signal produced by LO 216 is controlled by tuning a phase locked loop circuit, shown as circuit 217, which is, in turn, controlled by system controller 250 through a control interface.

In a similar manner, tuner 220 has mixers 221 and 225, LOs 222 and 226, circuits 223 and 227, and IF filter 224. Tuner 220 of embodiments operates as described above with respect to tuner 210, although LOs 222 and 227 may be controlled independently of LOs 212 and 217 to provide a different signal (e.g., channel) as an output signal, $f_{OUT2}$, of tuner 220.

The output signals of tuners 210 and 220 of the illustrated embodiment are provided to using device 240, such as may comprise a set-top cable box, cable modem, Plug-and-Play™ device, TiVo™ device, a television with picture-in-picture capability, or the like. Using device 240 may comprise various circuits, such as demodulator 241, processor 242, and memory 243, utilized in further processing the signals output from tuners 210 and 222.

As a set of new (different) carrier frequencies are selected (e.g., one or more new channels are selected), one or more LO frequencies of tuners 210 and/or 220 are adjusted by operation of controller 250. LO frequencies should be carefully chosen to avoid spurious signals appearing in the output band of interest associated with tuners 210 and 220. Although a number of LO frequencies may provide conversion of a signal from a particular RF carrier frequency to a particular output frequency, many such LO combinations will have spurs associated therewith which also fall within the IF frequency bandwidths and/or output frequency bandwidths of either or both of tuners 210 and 220. Accordingly, before implementation of a particular LO frequency combination for tuning to a desired signal by tuners 210 and 220, the LO-related spurs are analyzed according to embodiments of the invention for undesired spurs. In device 200 of the illustrated embodiment, selection of LO frequencies and the associated spur analysis is done dynamically, such as at the time of channel selection. Accordingly, concepts of the present invention can be employed to minimize delay in tuning to selected channels.

One advantage of systems and methods of the present invention is time savings for alignment, when a tuner is used over a wide range of frequencies. In such a situation it is important to find the LO spurs quickly with as few calculations as possible as these calculations are made every time a channel is changed. Controller 250 of embodiments, which may be implemented in software, hardware or both, enables the first IF generated by the first mixer to be varied dynamically in order to solve the problem of spurious signal generation at certain channel values. Efficient selection of LO frequencies to avoid or minimize spurs is one object of an embodiment of the present invention.

A discussion of two types of spurs follows. Referring still to FIG. 2, two double conversion tuners with a single RF input are provided. Each of the tuners has a separate output which may be a different (or the same) channel. Each tuner may have certain spurs, referred herein as "intra-tuner" spurs, which are related to the local oscillators of the associated tuner. The frequency of each of the intra-tuner LO-related spurs can be calculated as:

$$f_{SPUR} = n \times f_1 - m \times f_2 \qquad (1)$$

where n and m are integer numbers representing, respectively the harmonics of the high and low local oscillator frequencies, and $f_1$ and $f_2$ are the local oscillator frequencies (e.g., $f_{LO1}$ and $f_{LO2}$, respectively where $f_{LO1} > f_{LO2}$). If any spur generated by a given combination of $f_{LO1}$ and $f_{LO2}$ falls within the output bandwidth ($f_{BW}$) of the tuner, that spur can degrade the quality of the output signal.

Each tuner may also have "inter-tuner" spurs related to local oscillators of one or more neighboring tuners. Generation of these output spurs is dependent on the particular local oscillator frequencies of the neighbor tuner.

Inter-tuner spurs can be calculated as:

$$f_{SPUR,1} = n \times f_{LO1,1} + m \times f_{LO1,2} - f_{LO2,1} \qquad (2)$$

$$f_{SPUR,2} = n \times f_{LO1,1} + m \times f_{LO1,2} - f_{LO2,2} \qquad (3)$$

where n and m are integers and |n|<max_harmonics and |m|<max_harmonics, and where max_harmonics=maximum number of harmonics of one tuner's LO which are present in another tuner's output, and where $f_{LO1,i}$=tuner i's first LO frequency and $f_{LO2,i}$=tuner i's second LO frequency.

For the tuners 210 and 220 of FIG. 2, equation (2) defines spurs falling within the output band of tuner 210, while equation (3) defines spurs falling within the output band of a tuner 220.

Therefore, intra-tuner and inter-tuner spur equations for multiple tuner systems are as follows:

$$f_{SPUR,i} = n \times f_{LO1,i} - m \times f_{LO2,i} \qquad (4)$$

$$\text{for } i=2 \to n, f_{SPUR,1} = n \times f_{LO1,1} + m \times f_{LO1,i} - f_{LO2,1} \qquad (5)$$

and $$\text{for } i=2 \to n, f_{SPUR,i} = n \times f_{LO1,1} + m \times f_{LO1,i} - f_{LO2,i} \qquad (6)$$

where equation (4) is an equation for intra-tuner spurs, equation (5) is an equation for inter-tuner spurs in a first tuner of a multiple tuner system, and equation (6) is an equation for inter-tuner spurs in tuners 2 through n in a multiple tuner system.

Equations (1) through (6) permit identification of two types of spurs in the tuner output band of interest. Other spurs may exist and could also be determined. As described herein, if a spur does exist within the desired output bandwidth, the LO frequencies may be adjusted to different values to avoid the spur falling within the output band.

The characteristic movement of spurs in response to different LO frequencies can be used to determine a particular range or continuum of first IF values yielding a spur in the output bandwidth. According to embodiments of the invention, this particular range of first IF values defines an exclusion zone of first IF values associated with a particular spur. First IF values within the exclusion zone yield a spur in the tuner output bandwidth. First IF values outside of the exclusion zone yield a tuner output which is free of the particular spur. In this manner, by selecting a particular IF value a known spur may be rejected at the output. At other times, a spur-free tuner output may not be possible and a choice between known spurs may be required in order to minimize the detrimental effect on tuner performance. As described herein in further detail, a scoring system can be utilized to rank particular spurs and to facilitate selection of local oscillator frequencies yielding a spur with minimal detrimental effect on tuner performance.

Figure 3:
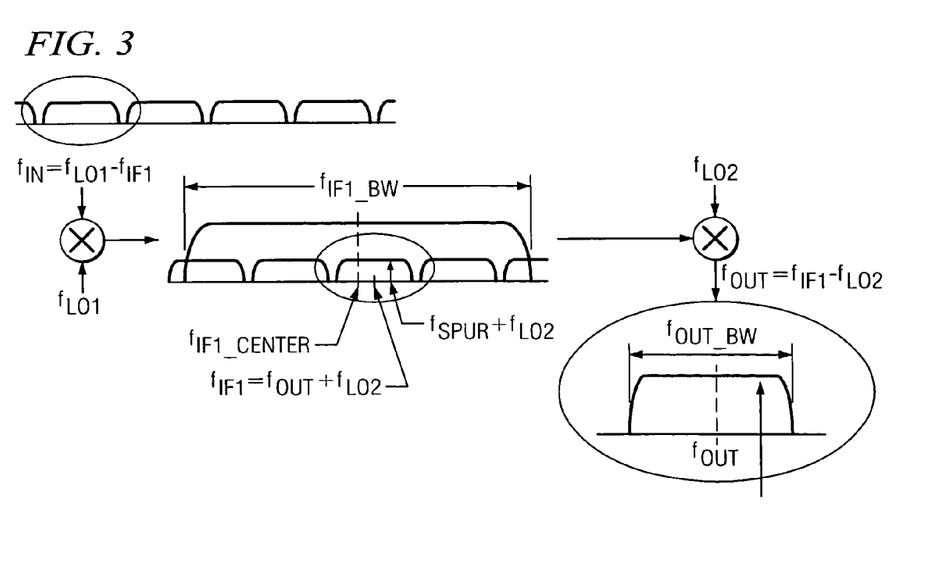
FIG. 3 illustrates a double conversion tuner having a spurious signal in an output band of a tuner.
Figure 4:
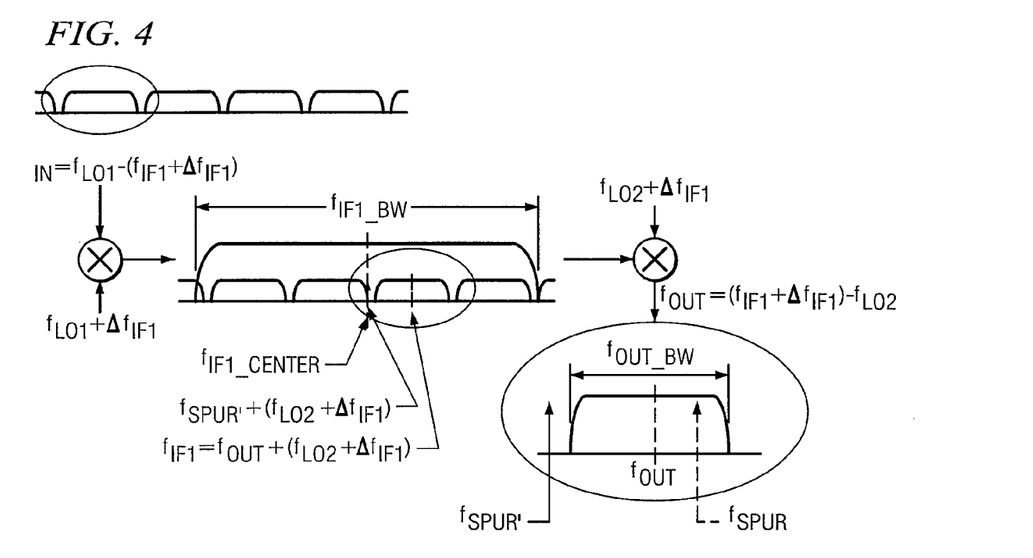
FIG. 4 illustrates the double conversion tuner of FIG. 3 wherein the spurious signal has been shifted out of the output band of the tuner and into an adjacent channel.
Figure 5:
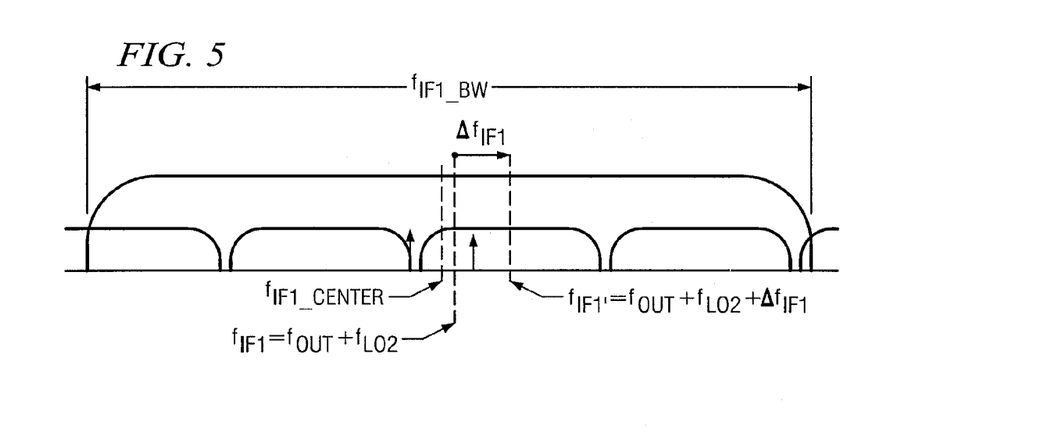
FIG. 5 shows the shift in intermediate frequency IF which resulted in the spurious signal shift of FIG. 4.

The frequency of a spur within the output bandwidth is a function of associated local oscillator frequencies. In multiple tuner devices a spur frequency of one tuner can be a function of the frequencies of local oscillators of another tuner (inter-tuner spurs). By varying the frequencies of associated local oscillators, a tuner spur may be shifted out of the tuner output bandwidth. FIGS. 3 through 5 provide an illustrative example of spur shifting as LO frequencies are adjusted in a dual conversion tuner.

FIG. 3 illustrates a tuner having an input signal, $f_{IN}$, and a local oscillator signal, $f_{LO1}$, connected to a first mixer. The first mixer generates an output signal within a first IF bandwidth. The output signal generated by the first mixer, is connected to a second mixer, where it is mixed with a second local oscillator signal, $f_{LO2}$. The second mixer generates an output signal, $f_{OUT}$. An intra-tuner spur exists at $f_{SPUR}$ in the output bandwidth of the tuner. The frequency of the spur can be determined by the equation:

$$f_{SPUR} = n \times f_{LO1} - m \times f_{LO2}.$$

FIG. 3 also shows the location of a predetermined first intermediate frequency (IF), ($f_{IF1} = f_{OUT} + f_{LO2}$). The first IF is different than the center frequency of the IF filter. In other embodiments, the first IF can be equal to the center frequency of the IF filter. In this particular example, the spur is an intra-tuner spur defined by equation (1) above.

FIG. 4 graphically illustrates the movement of the output spur from the location in FIG. 3 to a new location at $f_{SPUR'}$ which is outside of the tuner's output bandwidth. The position of the spur at $f_{SPUR'}$ shifted as a result of a change in $f_{IF1}$ by an amount equal to $\Delta f_{IF1}$. As intermediate frequency, $f_{IF1}$, is equal to $f_{LO2} + f_{OUT}$, and since it is preferred that $f_{OUT}$ remain fixed, the change in $f_{IF1}$ results from a change in the frequency of LO2. For comparison, the location of the spur from FIG. 3 is shown in phantom lines.

The IF bandwidth of the system of FIGS. 3 and 4 is provided in FIG. 5. FIG. 5 illustrates the movement of $f_{IF1}$ (by $\Delta f_{IF1}$) which results in the movement of the output spur at $f_{SPUR}$ to a location in an adjacent channel at $f_{SPUR'}$ (as shown in FIG. 4). FIGS. 3 through 5 together show that there is a definable range of IF frequencies within which a spur will remain in the output channel, and that this range is bounded by a limit, $\Delta f_{IF1}$, at which point the spur transitions out of the output channel and into an adjacent channel. Equations of interest include:

$$f_{SPUR} = n \times f_{LO1} - m \times f_{LO2} \tag{7}$$

$$f_{SPUR'} = n \times (f_{LO1} + \Delta f_{IF1}) - m \times (f_{LO2} + \Delta f_{IF1}) \tag{8}$$

$$\Delta f_{IF1} = (f_{SPUR'} - f_{SPUR})/(n-m) \tag{9}$$

Figure 6:
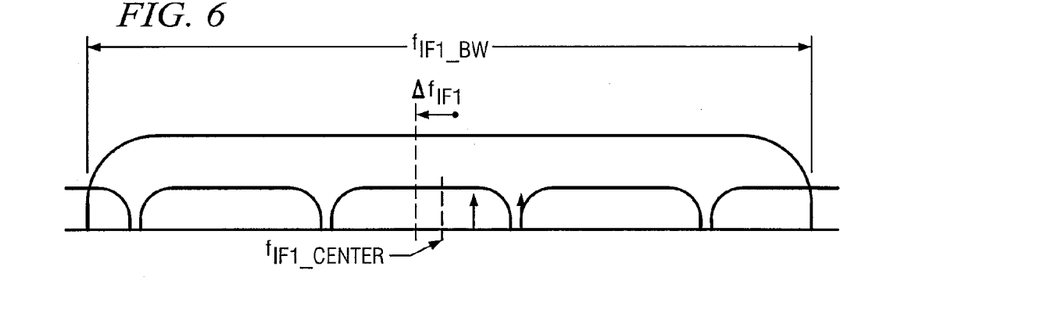
FIG. 6 shows the shift in intermediate frequency IF which results in a spurious signal shift to another adjacent channel.

FIG. 6 illustrates another range of IF frequencies within which the spur will remain in the output channel, and that this range is bounded by the limit, $\Delta f_{IF1}$, at which point the spur transitions out of the output channel and into the adjacent channel (opposite the channel of FIG. 5).

Figure 7:
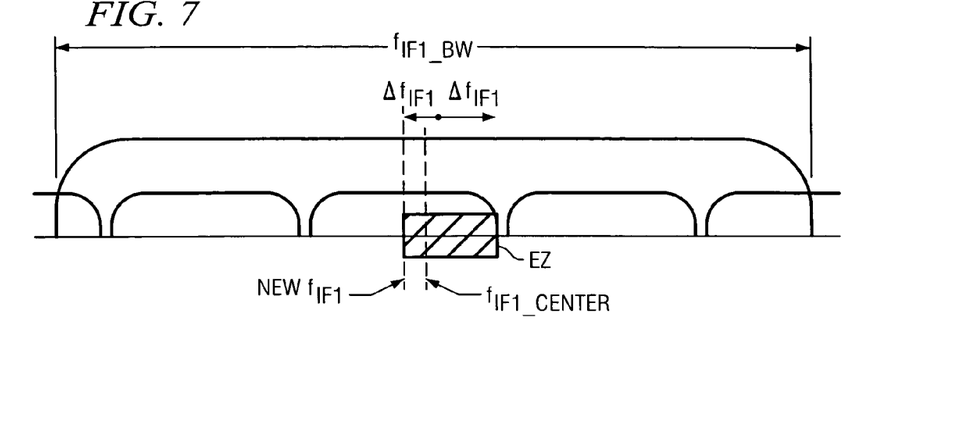
FIG. 7 shows a range or intermediate frequencies within which the spurious signal will remain in the output band of the tuner.

FIG. 7 combines the information of FIGS. 5 and 6 to define an exclusion zone (EZ) of IF frequencies. For IF frequencies selected within this exclusion zone, this particular spur will remain in the tuner output channel. However, with a selection of an IF frequency outside of the exclusion zone, the particular spur will be shifted into an adjacent channel. A map of IF frequency exclusion zones for each spur (intra-tuner, inter-tuner, or other) may be similarly created.

Figure 8:
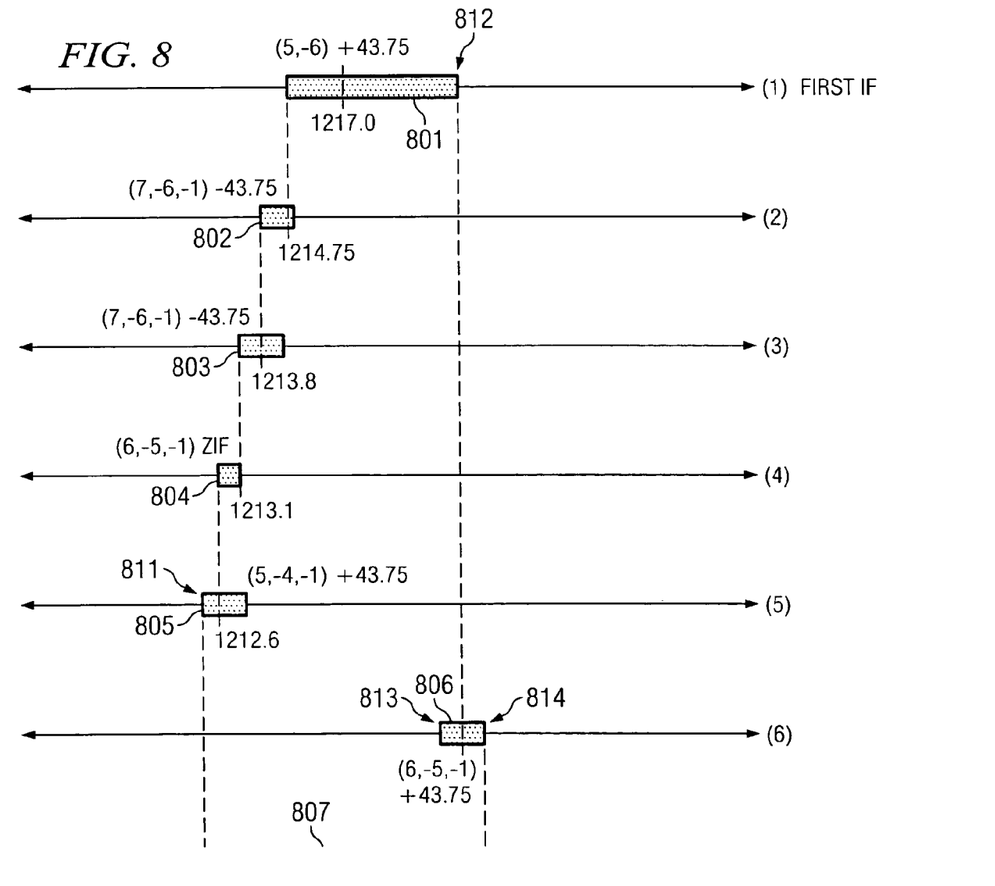
FIG. 8 shows an example of a method of practicing concepts of the present invention.

FIG. 8 represents an example of exclusion zone mapping for a dual tuner system. A system having two television tuners providing an output signal at 43.75 MHz was evaluated. The first line of FIG. 8 represents the exclusion zone 801 of a first identified spur, a n=5, m=−6, intra-tuner spur at 43.75 MHz. Exclusion zone 801 of this spur is 6.75 MHz wide. In order to avoid this particular spur, an IF frequency outside of exclusion zone 801 is selected. Any selected IF frequency which is outside of exclusion zone 801 would cause this particular spur to transition out of the tuner output band. IF frequencies at the boundaries of the exclusion zone define two acceptable IF choices. In this example, the IF frequency at the boundary of exclusion zone 801 which is nearest to the first IF frequency (1217.0 MHz) is selected. At this new IF frequency (i.e., IF=1214.75 MHz), another spur analysis is conducted. Another spur was detected, an inter-tuner spur at −43.75 MHz comprising the $7^{th}$ harmonic of LO1, the $-6^{th}$ harmonic of LO1 of the other tuner, and the −1 harmonic of the other tuner. The second line of FIG. 8 illustrates the exclusion zone 802 of this spur. In similar fashion, the IF frequency at the boundary of exclusion zone 802 (IF=1213.8 MHz) is selected. At this new IF frequency, spur analysis reveals yet another spur (7, −6, −1) in the output. While the spur coefficients are the same, this spur is associated with a different tuner than the spur of the $2^{nd}$ line of FIG. 8. The third line of FIG. 8 illustrates another exclusion zone 803 around the selected IF frequency of 1213.8 MHz. To avoid this spur, another IF frequency (at 1213.1 MHz) is selected. The fourth line of FIG. 8 illustrates the exclusion zone 804 associated with a spur (6, −5, −1) that forms near 0 MHz instead of the output frequency. This is an example of another class of spurs whose equations can be used to determine exclusion zones. Again, to avoid this spur another IF frequency at the exclusion zone boundary (IF=1212.6 MHz) is selected. Yet another spur (5, −4, −1) exists with IF=1212.6 MHz and having an exclusion zone 805. Exclusion zone 805 defines a range of IF values within which this particular spur will exist within the tuner output bandwidth. Similar to the exercise of previous exclusion zones 801, 802, and 803, another IF value can be selected to avoid this particular spur. The IF boundary value 811 of exclusion zone 805 would yield a spur-free tuner output. IF value 811 may be outside of the range of acceptable IF values and therefore not usable. For example, IF value 811 may fall outside of the bandwidth of an IF filter or an IF value closer to the original IF value may be more desirable. Assuming that IF boundary value 811 is not acceptable, the IF boundary value 812 of exclusion zone 801 may be selected as the IF value closest to the original IF value. At this new IF frequency, yet another spur exists. The exclusion zone 806 of this spur is illustrated in line 6 of FIG. 8 having boundary IF values at 813 and 814. In this example, IF boundary values 814 yields a spur free output.

A comprehensive exclusion zone 807 in line 7 can be defined as a merging of all exclusion zones 801, 802, 803, 804, 804, 805, and 806. Since all of the exclusion zones have overlapping frequency ranges, a single continuous exclusion zone 807 can be defined. In order to avoid all of the spurs of lines 1 through 6 of FIG. 8, an IF value outside of exclusion zone 807 would be selected. An IF value within exclusion zone 807 will result in a spur in the output bandwidth of the associated tuner. There is no requirement that the exclusion zones be continuous and in other systems several discrete exclusion zones may be defined. In one preferred embodiment of the present invention, the exclusion zone data would be merged into a table and stored for subsequent accessing and/or processing.

Had it been necessary to select an IF value within exclusion zone 807 of FIG. 8, a scoring system could be utilized to facilitate selection of a least detrimental IF value. It would be desirable to score the spurs associated with each IF frequency and then select a particular IF frequency having minimal effect on tuner output. A variety of different scoring methods or algorithms may be used. In one scoring method, spurs are scored according to harmonic values, with those spurs generated by lower local oscillator harmonics being more detrimental than those spurs generated by higher local oscillator harmonics.

Figure 9:
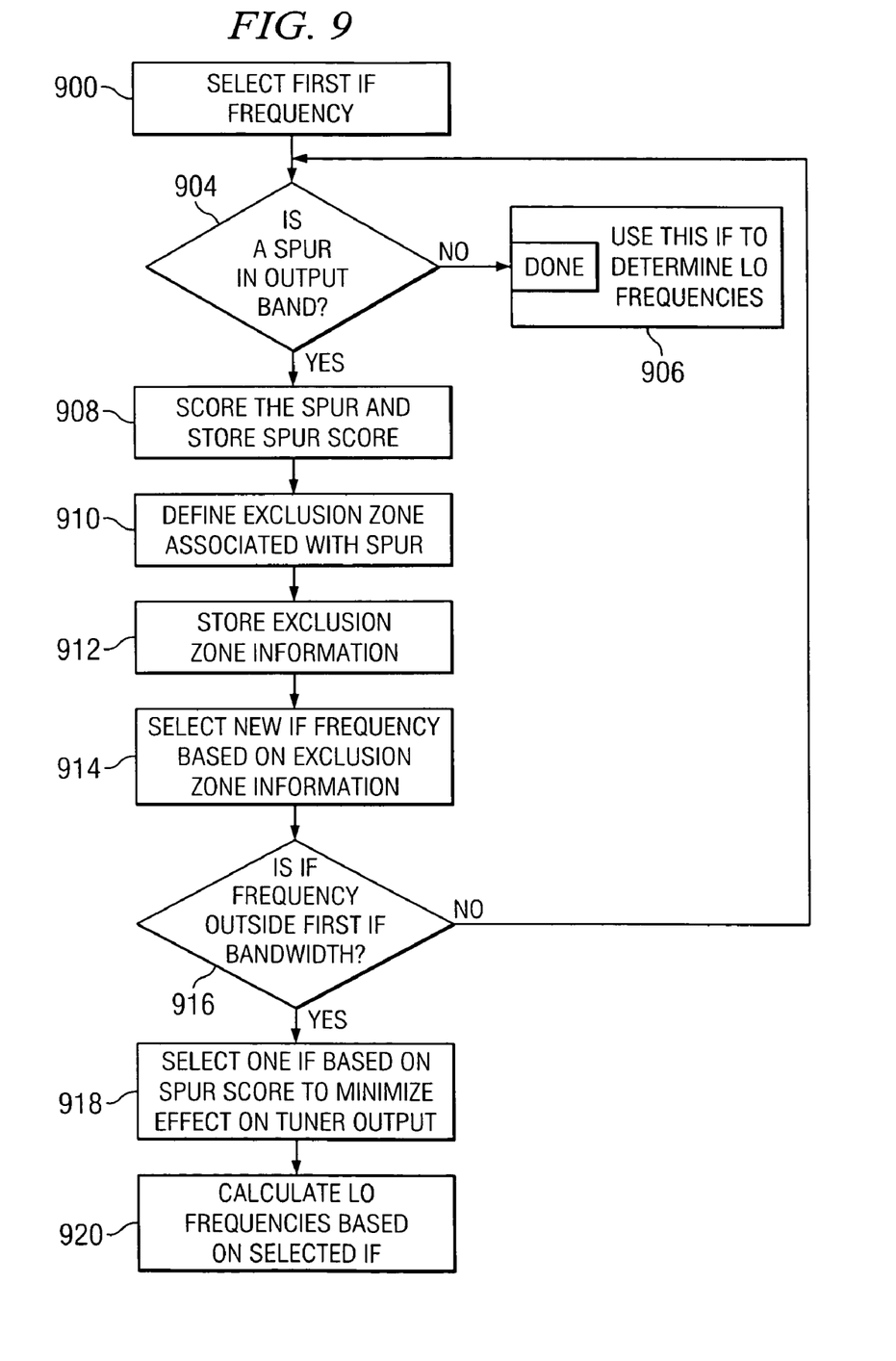
FIG. 9 shows one embodiment of a method of practicing concepts of the present invention.

Summarizing the above discussion, FIG. 9 provides one method for eliminating or minimizing the effect of spurs in an output of a multi-tuner system. Step 900 selects the first IF frequency for a tuner, which may be the center frequency of the IF filter or some other frequency. In step 904, the existence a tuner output spur in the tuner output bandwidth is determined. The spur may be an inter-tuner spur, an intra-tuner spur, or another spur. If no spur exists inside the output band of interest, no further analysis is required as indicated by step 906. For a spur existing within the output band of interest, a spur score is optionally generated and stored in step 908. Next, an exclusion zone of the particular spur is defined in step 910 and stored in step 912. Exclusion zones of different spurs may be merged into a table or other format during storage. In step 914, a new IF frequency is selected based on exclusion zone information of step 912. For example, the new IF frequency may be at a boundary of one of the exclusion zones. A boundary closest to the original IF frequency may be selected. If the new IF frequency is within the first IF bandwidth, the steps of determining spur existence, spur scoring, and exclusion zone creation is repeated as indicated by step 916. If the IF frequency is outside the 1$^{st}$ IF bandwidth, or if all possible IF values have been evaluated, one of the IF frequencies associated with a preferred score (low or high) may be selected with reference to the stored spur score from step 908 as indicated in step 918. Finally, once an IF frequency is selected, the LO frequencies of the tuner may be selected as indicated in step 920. Keep in mind that a tuner output spur will exist with these LO frequencies, however the spur's effect may be minimal in comparison to other LO frequencies. The routine of FIG. 9 would be repeated during channel selection or change to address one or more tuner output spurs.

The algorithm of FIG. 9 can be implemented by a general purpose digital computer within a multiple tuner system. Alternatively, the process may be executed by a dedicated, special purpose processor. In one embodiment of the present invention, the processor may be on the same board as the multiple tuners, associated memory, and other discrete electronics. In another embodiment, the processor and multiple tuners may be on a single integrated circuit. In another embodiment, the processor may be remotely disposed and in communication with the tuners. For a multiple tuner system such as disclosed in FIG. 2, a controller 250 communicates via a control interface in order to tune the different phase locked loops associated with the local oscillators of the tuners.

The inventions disclosed herein promote efficient selection of IF values without resorting to the large tables of local oscillator frequencies used to avoid spurs in the prior art. Tuner flexibility and efficiency is improved since large LO frequency tables need not be calculated. Tuner proximity in multiple tuner devices can be minimized by utilizing the spur avoidance techniques of the present invention. The present invention finds particular utility to multiple tuners on a single circuit board or within a single integrated circuit wherein the distance between tuners can be minimized.

Note that while the embodiments discuss local oscillator frequencies, the inventive concepts would be applicable to any frequency interference sensitive circuit or system where the harmonics of frequencies could add spurs (or extraneous frequencies) into a circuit at specific frequencies.

Also, note that the inventions disclosed herein can be applied to tuners having more than one intermediate frequency, such as triple or quadruple conversions tuners. Additionally, the inventions disclosed herein could be applied to combinations of single and multiple conversion tuners and to systems having any number of tuners. Likewise, concepts of the present invention are applicable to single tuner systems. For example, the above mentioned exclusion zones may be utilized with respect to intra-tuner spurs of a multiple conversion single tuner system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of avoiding interfering signals in an electronic system, said method comprising:
   determining an output band of interest for a tuner;
   determining a first mixing frequency;
   determining a second mixing frequency;

identifying a spurious signal as a function of particular harmonics of said first and second mixing frequency;

defining an exclusion zone associated with the spurious signal, said exclusion zone providing information with respect to frequency values resulting in the spurious signal being within the output band of interest; and selecting a new frequency for at least one of said first mixing frequency and said second mixing frequency as a function of the exclusion zone to result in the spurious signal associated with the particular harmonics being shifted from the output band of interest.

2. The method of claim 1, wherein said first mixing frequency comprises a local oscillator frequency of a multiple conversion tuner and said second mixing frequency comprises another local oscillator frequency of said multiple conversion tuner.

3. The method of claim 1, wherein said first mixing frequency comprises a local oscillator frequency of a tuner in a multiple tuner system and said second mixing frequency comprises a local oscillator frequency of another tuner in said multiple tuner system.

4. The method of claim 3, wherein said tuner comprises a single conversion tuner and said another tuner comprises a multiple conversion tuner.

5. The method of claim 3, wherein said tuner comprises a multiple conversion tuner and said another tuner comprises a multiple conversion tuner.

6. The method of claim 3, further comprising:
determining a third mixing frequency, wherein said third mixing frequency comprises a local oscillator frequency of yet another tuner in said multiple tuner system, said identifying a spurious signal identifying said spurious signal as a function of particular harmonics of said first, second, and third mixing frequency.

7. The method of claim 3, wherein said output band of interest is associated with said tuner, said method further comprising:
determining another output band of interest for said another tuner;
defining another exclusion zone associated with the spurious signal, said another exclusion zone providing information with respect to frequency values resulting in the spurious signal being within the another output band of interest, wherein said selecting a new frequency selects a new frequency for at least one of said first mixing frequency and said second mixing frequency as a function of the exclusion zone and the another exclusion zone to result in the spurious signal associated with the particular harmonics shifted from the output band of interest and the another output band of interest.

8. The method of claim 1, further comprising:
determining another spurious signal as a function of different particular harmonics of said first and second mixing frequency as selected;
defining a combined exclusion zone, said combined exclusion zone comprising previously defined exclusion zones and an exclusion zone associated with the another spurious signal;
selecting a new frequency for at least one of said first mixing frequency and said second mixing frequency resulting in the another spurious signal associated with the different particular harmonics not being within the combined exclusion zone in order to shift the spurious signal from the output band of interest; and repeating said last mentioned determining, defining, and selecting steps until no spurious signal associated with a predetermined level of harmonics is present in the combined exclusion zone.

9. The method of claim 1, further comprising:
determining another spurious signal as a function of different particular harmonics of said first and second mixing frequency as selected;
defining a combined exclusion zone, said combined exclusion zone comprising previously defined exclusion zones and an exclusion zone associated with the another spurious signal;
selecting a new frequency for at least one of said first mixing frequency and said second mixing frequency resulting in the another spurious signal associated with the different particular harmonics not being within the combined exclusion zone in order to shift the spurious signal from the output band of interest;
repeating said last mentioned determining, defining, and selecting steps until it is determined that a spurious signal associated with a predetermined level of harmonics cannot be avoided in the combined exclusion zone; and
scoring different ones of the spurious signals determined in the preceding steps to identify a spurious signal associated with a minimum amount of interference in the output band of interest.

10. The method of claim 1, wherein said determining said first mixing frequency comprises:
selecting a first intermediate frequency (IF), said exclusion zone identifies a range of values for said first IF associated with the spurious signal being within the output band of interest.

11. The method of claim 10, wherein the first IF is outside of the exclusion zone.

12. The method of claim 1, further comprising:
defining a composite exclusion zone by combining a plurality of exclusion zones.

13. A method of avoiding interfering signals in an electronic system, said method comprising:
determining an output band of interest for a tuner;
selecting a first intermediate frequency (IF;
determining a first mixing frequency;
determining a second mixing frequency;
identifying a spurious signal as a function of particular harmonics of said first and second mixing frequency;
defining an exclusion zone of first IF values associated with the spurious signal, said exclusion zone containing first IF values resulting in the spurious signal within the output band of interest; and
selecting a new IF value outside of the exclusion zone in order to shift the spurious signal from the output band of interest.

14. The method of claim 13 further comprising the steps of:
selecting a first mixing frequency of a second tuner;
and identifying a spurious signal as a function of particular harmonics of said first and second mixing frequency and said first mixing frequency of the second tuner.

15. The method of claim 14 further comprising the steps of:
selecting a second mixing frequency of the second tuner;
and identifying a spurious signal as a function of particular harmonics of said first and second mixing frequencies and said first and second mixing frequencies of the second tuner.

16. The method of claim 14, wherein a plurality of different exclusion zones are defined in relation to a plurality of different spurious signals.

17. The method of claim 16 further comprising:
defining a composite exclusion zone of first IF values by combining the plurality of different exclusion zones.

18. The method of claim 13 further comprising the step of:
determining new first and second mixing frequencies based on the new IF value.

19. A method of minimizing interference from multiple tuners, said method comprising:
selecting a first intermediate frequency (IF) for a first tuner;
determining a mixing frequency for the first tuner associated with said first IF;
determining a mixing frequency for a second tuner;
identifying a first spurious signal as a function of particular harmonics of said mixing frequency of the first tuner and said mixing frequency of the second tuner;
selecting a different first IF value which rejects the first spurious signal from an output band of interest;
determining a different mixing frequency for the first tuner associated with said different first IF;
identifying a different spurious signal as a function of particular harmonics of said different mixing frequency of the first tuner and said mixing frequency of the second tuner; and
selecting either the first IF value or the different first IF value based on a spur criteria in order to minimize interference within the output band of interest.

20. The method of claim 19, wherein said output band of interest is associated with said first tuner.

21. The method of claim 19, wherein said output band of interest is associated with said second tuner.

22. The method of claim 19, wherein said output band of interest comprises a sub-band of interest associated with said first tuner and a sub-band of interest associated with said second tuner.

23. The method of claim 19, further comprising:
determining a mixing frequency for a third tuner, wherein said identifying a first spurious signal is a function of said particular harmonics of said mixing frequency of the first tuner, said mixing frequency of the second tuner, said mixing frequency of the third tuner, or all three.

24. The method of claim 19, wherein the spur criteria comprises a calculated score, and said step of selecting comprises evaluation of the spur scores of the first spurious signal and the second spurious signal.

25. The method of claim 24, wherein the scores are determined as a function of harmonic values.

26. The method of claim 24, wherein the scores are determined as a function of spurious signal location within the output band of interest.

27. The method of claim 19 further comprising the step of:
defining an exclusion zone of first IF values associated with the first spurious signal within which the first spurious signal remains within the output band of interest.

28. The method of claim 27, wherein the step of selecting the different first IF value is made with reference to the exclusion zone of first IF values.

29. The method of claim 28, wherein the selected different first IF is outside of the exclusion zone.

30. A multiple tuner system comprising:
a first tuner having a mixer which accepts an input signal and a mixing signal to generate a first intermediate frequency (IF);
a second tuner having a mixer and a mixing signal;
means for determining an output band of interest for the first tuner;
means for identifying a spurious signal as a function of particular harmonics of the mixing signals;
means for defining a zone of first IF values associated with the spurious signal, said zone containing first IF values yielding the spurious signal within the output band of interest; and
means for selecting a new first IF value outside of the zone which rejects the spurious signal from the output band of interest.

31. The multiple tuner system of claim 30, wherein the mixing signal of the second tuner remains constant while the zone of first IF values is defined.

32. The multiple tuner system of claim 30 further comprising:
means for determining a new mixing signal for the first tuner based on the new IF value.

33. The multiple tuner system of claim 30, wherein a plurality of different spurious signals are evaluated and further comprising:
storage means for storing information relating to different zones of first IF values associated with the plurality of different spurious signals.

34. The multiple tuner system of claim 30 further comprising:
means for selecting a first IF value with reference to the plurality of different zones of first IF values.

35. The multiple tuner system of claim 34, wherein the means for selecting comprises means for evaluating a score associated with each of the plurality of different first IF values.

36. The multiple tuner system of claim 30, wherein said first tuner comprises a dual conversion tuner and said mixing signal comprises a first local oscillator frequency and a second local oscillator frequency.

37. The multiple tuner system of claim 36, wherein the means for selecting a new first IF value includes a controller to vary the first local oscillator frequency and the second local oscillator frequency.

38. A method of minimizing interference from multiple tuners, said method comprising:
determining an input frequency band ($f_{IN}$) and output frequency band ($f_{OUT}$) for a first double conversion tuner;
selecting a first intermediate frequency ($f_{IF1}$) for the first double conversion tuner;
determining local oscillator frequencies ($f_{LO1,1}$ and $f_{LO2,1}$) of the first double conversion tuner to provide a desired signal appearing in the input frequency ($f_{IN}$) at he first intermediate frequency ($f_{IF1}$) and within the output frequency band ($f_{OUT}$);
determining local oscillator frequencies ($f_{LO1,1}$ and $f_{LO2,2}$) of a second double conversion tuner;
identifying a first spurious signal associated with interaction of local oscillator frequencies between the first and second double conversion tuners;
selecting a different first IF ($f'_{IF1}$), which rejects the first spurious signal from the output band of interest;
identifying a different spurious signal associated with interaction of local oscillator frequencies between the first and second double conversion tuners; and
selecting either $f_{IF1}$ or $f'_{IF1}$ based on spur criteria and accepting the associated spur within the output band of interest.

39. The method of claim 38, wherein the spur criteria comprises a spur score which is determined as a function of harmonic values of the associated spur.

40. The method of claim 38, wherein the spur criteria comprises a spur score which is determined as a function of spurious signal location within an output band of interest.

41. A multiple tuner system comprising:
- a first tuner having a mixer which accepts an input signal and a mixing signal to generate a first intermediate frequency (IF);
- a second tuner having a mixer and a mixing signal; and
- a system controller having means for determining an output band of interest for the first tuner; means for identifying a spurious signal as a function of particular harmonics of the mixing signals; means for defining ozone of first IF values associated with the spurious signal, said zone containing first IF values yielding the spurious signal within the output band of interest; and means for selecting a new first IF value outside of the zone which rejects the spurious signal from the output band of interest.

42. The multiple tuner system of claim 41, wherein the mixing signal of the second tuner remains constant while the zone of first IF values is defined.

43. The multiple tuner system of claim 41, wherein the first tuner and second tuner are on a single circuit board.

44. The multiple tuner system of claim 43, wherein the system controller is on the single circuit board.

45. The multiple tuner system of claim 43, wherein the first and second tuners are each multiple conversion tuners.

46. The multiple tuner system of claim 45, wherein the local oscillators associated with the second dual conversion tuner remain fixed while the new first IF value of the first tuner is selected and the local oscillators associated with the first tuner are adjusted.

47. The multiple tuner system of claim 43, wherein the first tuner is a multiple conversion tuner and said second tuner is a single conversion tuner.

48. The multiple tuner system of claim 43, wherein the system controller further comprises means for evaluating the spurious signal and a new spurious signal occurring at the selected new first IF value.

49. The multiple tuner system of claim 48, wherein the means for evaluating includes means for assigning a score to each of the spurious signal and the new spurious signal.

50. The multiple tuner system of claim 49, wherein the means for assigning a score includes means for determining the relative detrimental effect of a spurious signal.

51. A computer program product stored on a computer readable medium for selecting between a set of spurious signals existing on a multiple tuner system, said computer program product comprising:
- code for determining an output band of interest for a first tuner;
- code for selecting a first intermediate frequency (IF) for the first tuner;
- code for determining a mixing frequency for each of the first tuner and a second tuner;
- code for identifying a first spurious signal as a function of particular harmonics of any individual, or combination of, said mixing frequency of the first tuner and said mixing frequency of the second tuner;
- code for selecting a different first IF value which rejects the first spurious signal from the output band of interest;
- code for identifying a different spurious signal as a function of particular harmonics of any individual or combination of a different mixing frequency of the first tuner and said mixing frequency of the second tuner; and
- code for selecting either the first IF value or the different first IF value based on a spur criteria in order to minimize interference within the output band of interest.

52. The computer program product of claim 51, wherein the spur criteria comprises a calculated score, and said step of selecting comprises evaluation of the spur scores of the first spurious signal and the second spurious signal.

53. The computer program product of claim 51, wherein the scores are determined as a function of harmonic values.

54. The computer program product of claim 51, wherein the scores are determined as a function of spurious signal location within the output band of interest.

55. The computer program product of claim 51 further comprising the step of:
- defining an exclusion zone of first IF values associated with the first spurious signal within which the first spurious signal remains within the output band of interest.

56. The computer program product of claim 55, wherein the step of selecting the different first IF value is made with reference to the exclusion zone.

57. The computer program product of claim 56, wherein the selected different first IF is outside of the exclusion zone.

58. A method of operating two tuners in close proximity, said method comprising:
- selecting a mixing frequency for a first tuner;
- determining an output band of interest for a second tuner;
- selecting a first intermediate frequency (IF) for the second tuner and determining a mixing frequency for the second tuner;
- identifying a first spurious signal as a function of particular harmonics of said mixing frequency of the first tuner and said mixing frequency of the second tuner;
- selecting a different first IF value which rejects the first spurious signal from the output band of interest and determining a different mixing frequency for the second tuner;
- identifying a different spurious signal as a function of particular harmonics of said different mixing frequency of the second tuner and said mixing frequency of the first tuner; and
- selecting either the first IF value or the different first IF value based on a spur criteria in order to minimize interference within the output band of interest of the second tuner.

59. The method of claim 58, wherein one or more of said steps are performed iteratively to select a best first IF value based on said spur criteria.

60. The method of claim 58, wherein said selecting either the first IF value or the different first IF value is based on spur criteria in order to minimize interference within the output band of interest of the first and second tuner.

61. The method of claim 58, wherein said spur criteria comprises said spur not falling within an exclusion zone identified with respect to said first IF.

62. The method of claim 58, wherein said spur criteria comprises said spur being scored as a spur resulting in a least amount of interference within the output band of interest of the second tuner.

* * * * *